(12) United States Patent
Uchiyama

(10) Patent No.: US 10,038,239 B2
(45) Date of Patent: Jul. 31, 2018

(54) ANTENNA ADJUSTING APPARATUS AND ANTENNA ADJUSTING METHOD

(71) Applicant: SKY Perfect JSAT Corporation, Tokyo (JP)

(72) Inventor: Hiroshi Uchiyama, Ichikawa (JP)

(73) Assignee: SKY Perfect JSAT Corporation, Tokyo (JP)

( * ) Notice: Subject to any disclaimer, the term of this patent is extended or adjusted under 35 U.S.C. 154(b) by 0 days.

(21) Appl. No.: 15/553,084

(22) PCT Filed: Jan. 25, 2016

(86) PCT No.: PCT/JP2016/052041
§ 371 (c)(1),
(2) Date: Aug. 23, 2017

(87) PCT Pub. No.: WO2017/130276
PCT Pub. Date: Aug. 3, 2017

(65) Prior Publication Data
US 2018/0040951 A1    Feb. 8, 2018

(51) Int. Cl.
*H01Q 3/08* (2006.01)
*H01Q 1/12* (2006.01)
(Continued)

(52) U.S. Cl.
CPC ............. *H01Q 3/08* (2013.01); *H01Q 1/125* (2013.01); *G01S 19/42* (2013.01); *H01Q 15/16* (2013.01)

(58) Field of Classification Search
CPC ................................ H01Q 3/00; H01Q 1/125
(Continued)

(56) References Cited

U.S. PATENT DOCUMENTS

2002/0029110 A1* 3/2002 Fukuda ............... G01C 21/165
701/470
2002/0178815 A1   12/2002 Challoner
(Continued)

FOREIGN PATENT DOCUMENTS

JP    H10090389 A    4/1998
JP    2002158525 A    5/2002
(Continued)

OTHER PUBLICATIONS

Extended European Search Report issued in European Patent Application No. 16887863.5 dated Dec. 1, 2017.
(Continued)

*Primary Examiner* — Harry K Liu
(74) *Attorney, Agent, or Firm* — Marshall, Gerstein & Borun LLP

(57) ABSTRACT

An antenna adjusting apparatus comprises a sensor that acquires attitude information; a movable axis acquiring unit that acquires a plurality of vectors corresponding to the plurality of axes respectively by acquiring a change in output of the sensor for each of the axes; a first direction acquiring unit that acquires a first direction corresponding to a directional axis of the antenna; a second direction acquiring unit that acquires a second direction, which is a direction with which the directional axis of the antenna is to be aligned; and a calculating unit that calculates, for each of the axes, a correction angle, using the plurality of vectors, wherein the first direction and the second direction are expressed by an Earth-based coordinate system.

8 Claims, 8 Drawing Sheets

(51) Int. Cl.
*G01S 19/42* (2010.01)
*H01Q 15/16* (2006.01)

(58) Field of Classification Search
USPC .......................................................... 342/359
See application file for complete search history.

(56) References Cited

U.S. PATENT DOCUMENTS

| | | | |
|---|---|---|---|
| 2007/0046537 A1* | 3/2007 | Tekawy | G01S 19/02 342/358 |
| 2008/0259317 A1* | 10/2008 | Schering | G01B 11/27 356/72 |
| 2013/0044027 A1* | 2/2013 | Martin | G01S 19/23 342/357.62 |
| 2016/0020504 A1 | 1/2016 | Michaelis et al. | |
| 2016/0336652 A1* | 11/2016 | Yoshida | H01Q 1/1257 |
| 2017/0059445 A1* | 3/2017 | Fujisawa | G01C 15/00 |

FOREIGN PATENT DOCUMENTS

| | | | |
|---|---|---|---|
| JP | 2011094690 A | 5/2011 | |
| JP | 2012080362 A | 4/2012 | |

OTHER PUBLICATIONS

International Search Report issued in PCT/JP2016/052041, dated Feb. 16, 2016.
Written Opinion issued in PCT/JP2016/052041, dated Feb. 16, 2016.

* cited by examiner

| SATELLITE | EAST LONGITUDE (DEGREES) | RADIUS OF REVOLUTION (km) |
|---|---:|---:|
| N-SAT-110 | 110.0 | 42164.0 |
| JCSAT-3A | 128.0 | 42164.0 |
| JCSAT-4A | 124.0 | 42164.0 |
| ... | ... | ... |

FIG. 4

ANTENNA ADJUSTING APPARATUS AND ANTENNA ADJUSTING METHOD

BACKGROUND OF THE INVENTION

Field of the Invention

The present invention relates to a technique for assisting adjustment of an antenna used for communicating with a satellite.

Description of the Related Art

Geostationary satellites are utilized for services such as broadcasting and communication. A geostationary satellite characteristically orbits a geostationary orbit at a same period as Earth's rotation and always appears at a position with a same azimuth and a same elevation from Earth. Normally, an antenna with directionality is used to communicate with a geostationary satellite.

When installing an antenna for communicating with a geostationary satellite, a direction of a directional axis of the antenna must be adjusted to coincide with a direction of the geostationary satellite as viewed from the antenna. Meanwhile, an azimuth and an elevation of a satellite as viewed from an antenna change in accordance with a location where the antenna is installed on Earth. Therefore, normally, an antenna is installed by a method involving determining an azimuth and an elevation to be set in accordance with an installation location of the antenna and adjusting an angle of the antenna accordingly.

Most ordinary parabolic antennas enable angles to be respectively adjusted in an azimuth direction and an elevation direction. For example, Japanese Patent Application Laid-open No. 2012-80362 discloses an antenna apparatus capable of finely adjusting an antenna by respectively rotating the antenna around a rotational axis corresponding to an azimuth and a rotational axis corresponding to an elevation.

SUMMARY OF THE INVENTION

When adjusting an antenna using angles set in advance, it is considered essential that the antenna be installed horizontally. However, it is difficult to make an actual installation location completely horizontal. In such cases, a deviation may occur even if an angle of the antenna is set to a prescribed azimuth and a prescribed elevation.

This problem becomes particularly conspicuous when an antenna is portable (such as a vehicle antenna). In order to solve this problem, an operation must be performed in which, after roughly setting an angle of the antenna, a signal is received from a satellite and an orientation of the antenna is finely adjusted so that maximum signal strength is obtained.

However, an operation of finely adjusting an orientation of an antenna while checking a level of a received signal is not easy for a general user who is inexperienced in installing antennas.

The present invention has been made in consideration of the problems described above and an object thereof is to provide a technique for enabling angle adjustment to be readily performed in an antenna apparatus which receives a signal from a geostationary satellite.

The present invention in its one aspect provides an antenna adjusting apparatus used for adjusting an attitude of an antenna having directionality and being capable of changing an attitude thereof to be changed by a plurality of axes.

In particular, the antenna adjusting apparatus comprises a sensor configured to acquire information relating to an attitude in a three-dimensional space; a movable axis acquiring unit configured to acquire a plurality of vectors corresponding to the plurality of axes respectively by acquiring a change in output of the sensor for each of the axes when the antenna mounted with the sensor is rotated around each of the axes; a first direction acquiring unit configured to acquire a first direction corresponding to a directional axis of the antenna, based on information output by the sensor; a second direction acquiring unit configured to acquire a second direction, which is a direction with which the directional axis of the antenna is to be aligned; and a calculating unit configured to calculate, for each of the axes, a correction angle, which is an angle by which the antenna is to be rotated in order to make the first direction and the second direction coincide with each other, using the plurality of vectors, wherein the first direction and the second direction are expressed by an Earth-based coordinate system.

The sensor is a unit configured to acquire the attitude of the antenna in a three-dimensional space by being mounted to an antenna main body. The sensor may be any kind of sensor including an acceleration sensor, a geomagnetic sensor, a gyroscope, a GPS receiver, or a combination thereof as long as an attitude in three-dimensional space can be acquired.

In addition, the movable axis acquiring unit is a unit configured to acquire an orientation of a rotational axis for adjusting the attitude of the antenna in a vector format. Specifically, the antenna is actually rotated around a plurality of axes and a vector corresponding to the rotational axis (hereinafter, an axis vector) is acquired based on an output result of the sensor acquired for each axis.

The first direction acquiring unit is a unit configured to obtain a direction (a first direction) corresponding to a directional axis of the antenna based on information acquired from the sensor. For example, when a positional relationship between a position on the antenna at which the sensor is mounted and the directional axis of the antenna is known in advance, the direction of the directional axis can be obtained based on the information acquired from the sensor.

In addition, the second direction acquiring unit is a unit configured to obtain a direction (a second direction) with which the directional axis of the antenna is to be aligned. Typically, the second direction is a direction of a geostationary satellite as viewed from an installation location of the antenna. The second direction may be manually input or selected from information stored in advance. Alternatively, when a GPS receiver is included in the sensor, the second direction may be acquired using information stored in advance and GPS coordinates.

The first and second directions are expressed by an Earth-based coordinate system (for example, the ECEF Cartesian coordinate system). Accordingly, the antenna can be adjusted by a same method regardless of where on Earth the antenna is installed.

The calculating unit is a unit configured to obtain an angle by which the antenna is to be rotated around each axis in order to correct a deviation between the first direction and the second direction. Specifically, based on a vector corresponding to each axis obtained by the movable axis acquiring unit and information which is acquired from the sensor, an amount of rotation of the antenna around each axis required to make the two directions coincide with each other is obtained.

According to the configuration described above, by simply moving the antenna mounted with the sensor for each axis, an amount of rotation necessary to track a satellite can be obtained. In other words, there is no longer a need to observe strength of a signal received from the satellite and antenna adjustment can be readily performed.

Also, the sensor may be a sensor configured to be capable of acquiring a direction of gravitational force, a true north direction, and GPS coordinates, and the first direction acquiring unit may acquire the first direction using the direction of gravitational force, the true north direction, and the GPS coordinates.

Since the first and second directions are expressed by an Earth-based coordinate system, information acquired by the sensor must be converted into an Earth-based attitude. The use of GPS coordinates by the sensor enables a point on Earth to be specified, and the use of directions of gravitational force and true north enables an attitude at the point to be specified.

Also, the second direction acquiring unit may determine the second direction using the GPS coordinates acquired by the sensor and positional information of a satellite stored in advance.

The GPS coordinates acquired by the sensor can also be used as information for acquiring the second direction.

Also, the first direction acquiring unit may acquire sensor position information, which is information relating to a mounting position of the sensor on the antenna, and may acquire the first direction further using the information.

When a relationship between the attitude of the sensor and the directional axis of the antenna is known in advance, the first direction can be obtained from information output by the sensor. Therefore, information (sensor position information) for converting a coordinate system based on the sensor into a coordinate system based on the antenna may be acquired. When a mounting position of the sensor is determined, the sensor position information may be stored in advance.

Also, the antenna may include one or more sensor bases for mounting the sensor, and the first direction acquiring unit may acquire sensor position information corresponding to the sensor base, to which the sensor is mounted.

Examples of the sensor base may include a stand on which the sensor is placed and a depression in which the sensor is placed or, when a mobile terminal such as a smartphone is used as the sensor, a holder and the like. In addition, by enabling sensor position information to be acquired for each sensor base, a plurality of sensor bases can be selected and used.

Also, the first direction and the second direction may be expressed using the ECEF coordinate system.

The ECEF coordinate system is a Cartesian coordinate system which uses Earth's center as an origin. While a world datum used by GPS expresses a position using an ellipsoid (a reference ellipsoid) approximating Earth, the use of the ECEF coordinate system enables a positional relationship with the satellite to be expressed more precisely.

Also, the antenna adjusting apparatus according to the present invention may further comprise a driving unit configured to change the attitude of the antenna by rotating the antenna around the plurality of axes, and the calculating unit may calculate a correction angle necessary for tracking a satellite at a prescribed period, and the driving unit may correct the attitude of the antenna, based on the calculated correction angle.

By calculating an angle necessary for correction at a prescribed period and changing the attitude of the antenna using the driving unit, even when the antenna moves, the directional axis can follow the antenna. In other words, even in an environment where a position or a direction of the antenna changes such as a vehicle-mounted environment, a communication state with the satellite can always be maintained.

Moreover, the present invention can be specified as an antenna adjusting apparatus including at least a part of the units described above. In addition, the present invention can also be specified as an antenna adjusting method executed by the antenna adjusting apparatus. The processes and units described above may be implemented in any combination thereof insofar as technical contradictions do not occur.

According to the present invention, angle adjustment can be readily performed in an antenna apparatus which receives a signal from a geostationary satellite.

BRIEF DESCRIPTION OF THE DRAWINGS

FIG. 4 shows an example of information stored in a satellite information storage unit.

DESCRIPTION OF THE EMBODIMENTS

Figure 1:
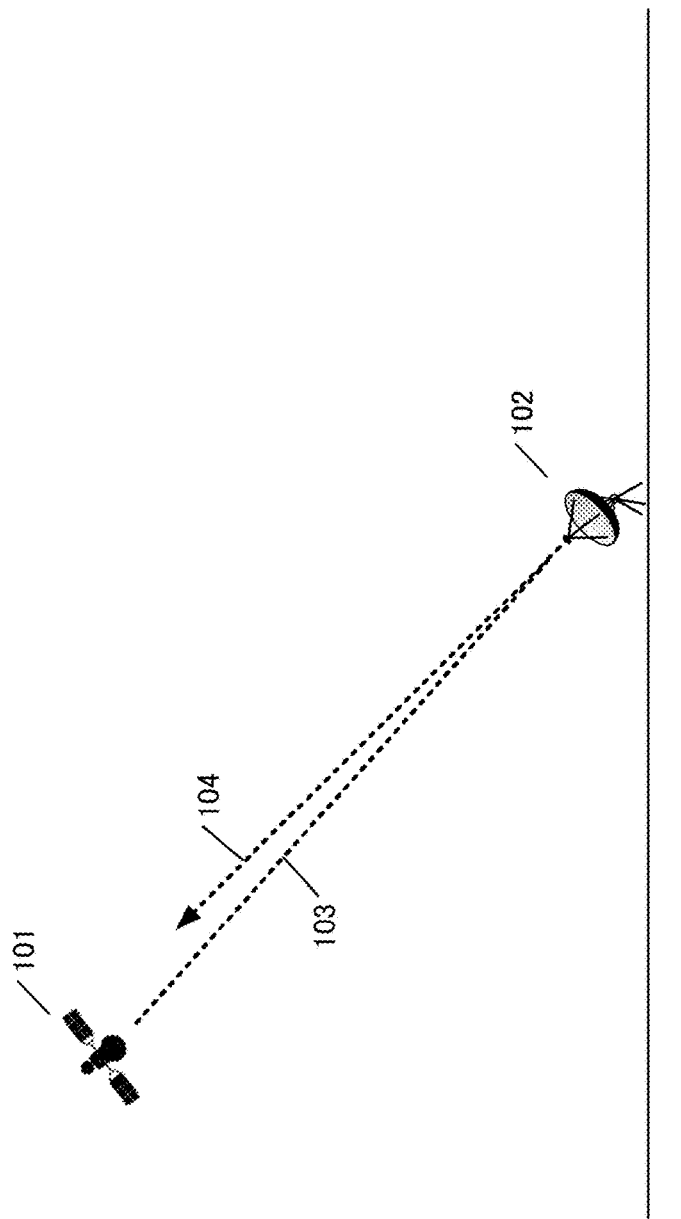
FIG. 1 is a diagram explaining a positional relationship between an antenna and a satellite.

Before describing embodiments, an outline of an antenna adjusting apparatus according to the present invention will be described with reference to FIG. 1.

Reference numeral 101 denotes a geostationary satellite (hereinafter, a satellite) which orbits a geostationary orbit positioned above the equator and reference numeral 102 denotes an antenna which communicates with the satellite 101. Communication between the antenna and the satellite is performed using high-frequency radio waves such as the UHF band or the SHF band. Reference numeral 103 denotes a propagation path of radio waves. The propagation path is a path connecting the satellite 101 and the antenna 102 by a straight line.

The antenna 102 is an antenna having strong directionality in a specific direction and is typically a parabolic antenna (hereinafter, an axis representing a direction in which the antenna 102 has directionality will be referred to as a directional axis). In the example shown in FIG. 1, reference numeral 104 denotes the directional axis. Strength of a signal received by the antenna 102 from the satellite 101 is strongest when an orientation of the directional axis 104 coincides with an orientation of the propagation path 103.

Figure 2:
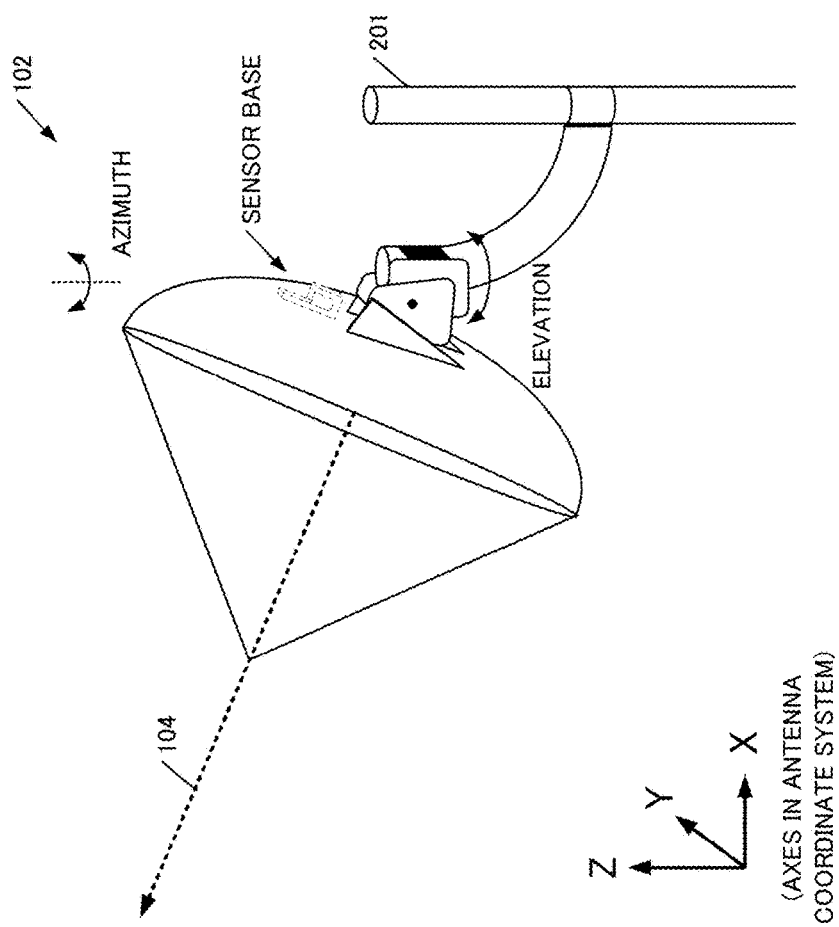
FIG. 2 is a perspective view showing an antenna which is an object on which an adjustment is to be performed.

Meanwhile, many known antennas are structured such that, in order to change the orientation of the directional axis, an attitude of the antenna can be adjusted using a plurality of axes. For example, as shown in FIG. 2, a general parabolic antenna has a structure which enables an azimuth and an elevation to be respectively adjusted. In the example shown in FIG. 2, the azimuth is adjusted by rotating the antenna around an axis parallel to a Z-axis direction in the diagram and the elevation is adjusted by rotating the antenna around an axis parallel to a Y-axis direction in the diagram.

Since the satellite is stationary as viewed from the antenna, an azimuth and an elevation to which the satellite should be adjusted are uniquely determined by a location where the antenna is installed on Earth. However, this is limited to cases where the location at which the antenna is installed is horizontal. For example, when an installation pole 201 for fixing the antenna is inclined with respect to the Z axis, a deviation in the directional axis occurs even when the antenna is adjusted to a prescribed azimuth and a prescribed elevation. In addition, even when the antenna is installed horizontally, there may be cases where it is difficult to adjust angles with precision such as when a unit configured to acquire an azimuth and an elevation (such as a compass or a sensor) is not built into the antenna itself.

Hereinafter, embodiments of the present invention which offer a solution to these problems will be described.

(First Embodiment)

An antenna adjusting apparatus according to the first embodiment is an apparatus which, after acquiring information on a present attitude of an antenna, calculates a rotation angle necessary for tracking a satellite (in other words, aligning a directional axis of the antenna with a direction of the satellite) for each of an azimuth and an elevation and notifies the rotation angles to a user. By adjusting an angle of the antenna based on a result of the notification, the user can adjust the antenna to an ideal angle.

Figure 3:
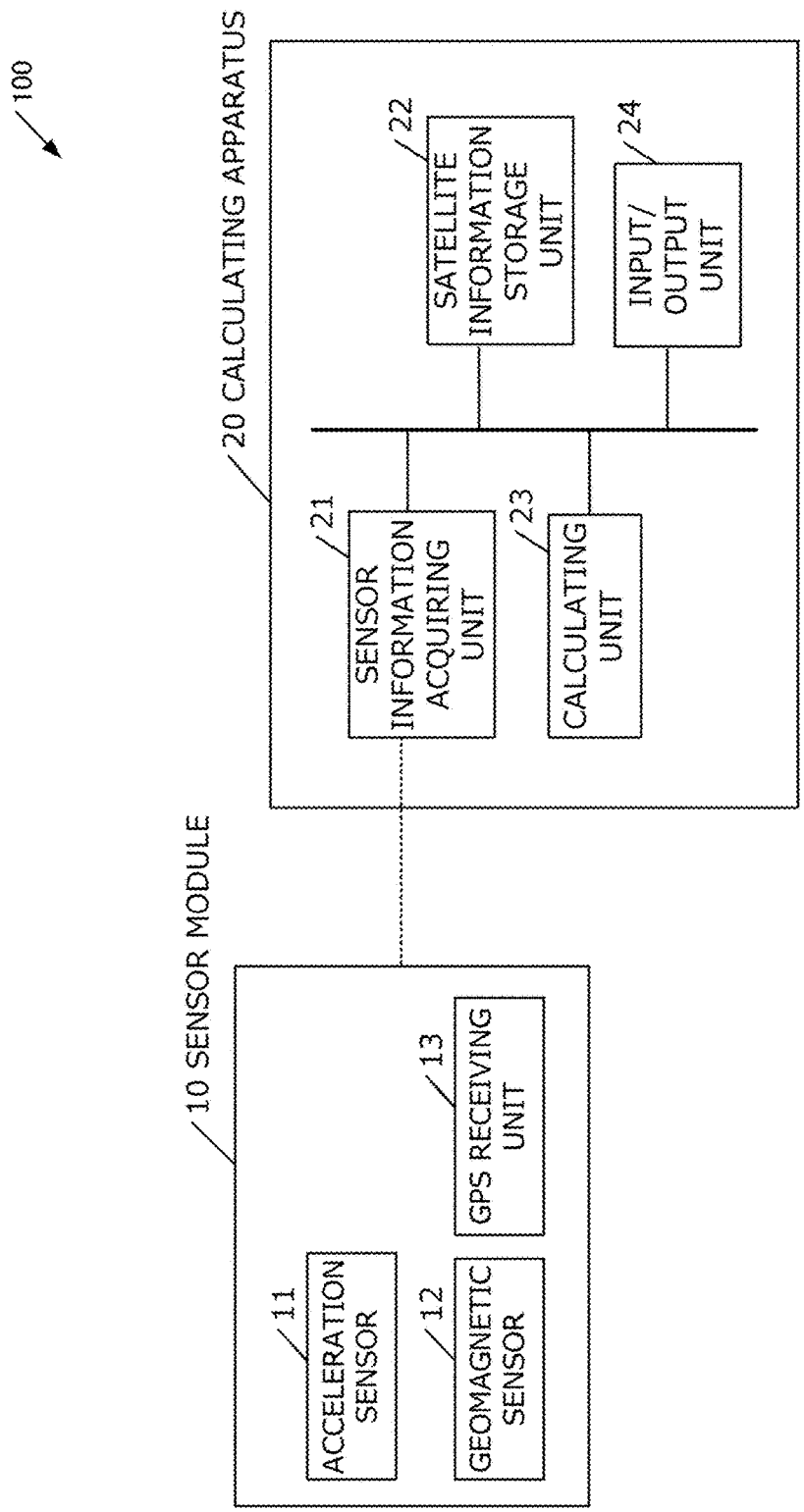
FIG. 3 is a system configuration diagram of an antenna adjusting apparatus 100 according to a first embodiment.

FIG. 3 is a system configuration diagram of the antenna adjusting apparatus according to the first embodiment. An antenna adjusting apparatus 100 according to the first embodiment is constituted by a sensor module 10 and a calculating apparatus 20.

While the antenna 102 that is an object on which an adjustment is to be performed is not a constituent of the present invention, a description thereof will now be given. The antenna 102 according to the present embodiment is a parabolic antenna as described above and includes a function for adjusting angles (an azimuth and an elevation) of a di axis using a hinge structure or an electronic unit.

Next, the sensor module 10 will be described. The sensor module 10 is a unit which is configured to detect an attitude in three-dimensional space and which is constituted by an acceleration sensor 11, a geomagnetic sensor 12, and a GPS receiving unit 13.

The acceleration sensor 11 is a sensor for detecting a direction of gravitational force and is typically a triaxial acceleration sensor. While the acceleration sensor 11 is a triaxial acceleration sensor in the present embodiment, any kind of sensor may be used as long as a direction of gravitational force (in other words, a vertical direction) relative to the sensor module 10 can be detected.

The geomagnetic sensor 12 is a unit configured to detect a magnetic north direction. While a geomagnetic sensor is used in the present embodiment, any kind of sensor may be used as long as a direction of magnetic north relative to the sensor module 10 can be detected.

The GPS receiving unit 13 is a unit configured to detect a position of the sensor module 10 on Earth. While the GPS receiving unit 13 is configured to acquire latitude and longitude in the present embodiment, the GPS receiving unit 13 may be configured to acquire other information as long as a position of the sensor module 10 on Earth can be detected.

The sensor module 10 houses the respective sensors described above and data acquired by each sensor is transmitted to the calculating apparatus 20 by wireless or wired communication.

Next, the calculating apparatus 20 will be described.

The calculating apparatus 20 is a computer including a CPU, a main storage apparatus, and an auxiliary storage apparatus. Functions described in the present specification are executed as a program stored in the auxiliary storage apparatus is loaded to the main storage apparatus and executed by the CPU. Alternatively, all of or a part of the illustrated functions may be executed using exclusively designed circuits.

A sensor information acquiring unit 21 is an interface for acquiring information from the sensor module 10. The sensor information acquiring unit 21 may be any of a wired interface or a wireless interface as long as information can be acquired from the sensor module 10. For example, the sensor information acquiring unit 21 may be an interface using Wi-Fi (registered trademark) or Bluetooth (registered trademark).

A satellite information storage unit 22 is a unit configured to store positional information with respect to a satellite that is an object of tracking. As shown in FIG. 4, in the present embodiment, positional information of a satellite with Earth as a reference is stored. Information stored by the satellite information storage unit 22 may have a tabular form such as that shown in FIG. 4 or may be a mathematical expression for calculating an angle. Alternatively, the positional information may use a reference other than Earth. For example, the positional information may be information regarding a point where the antenna is installed and azimuth and an elevation of the satellite as viewed from the point.

A calculating unit 23 is a unit configured to control the entire calculating apparatus 20. Specifically, based on information acquired from the sensor module 10, an angle by which correction is necessary is calculated for each of an azimuth and an elevation. Details of the process will be provided later.

An input/output unit 24 is a unit configured to accept an input operation performed by a user and to present information to the user. In the present embodiment, the input/output unit 24 is constituted by a single touch panel display. In other words, the input/output unit 24 is constituted by a liquid crystal display and a control unit thereof and a touch panel and a control unit thereof.

Next, a specific process of adjusting an angle of the antenna will be described.

Figure 5:
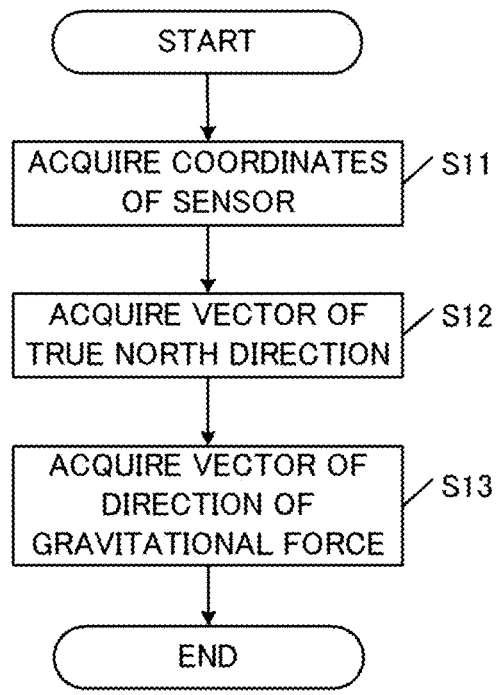
FIG. 5 is a flow chart of an antenna adjusting process.
Figure 6:
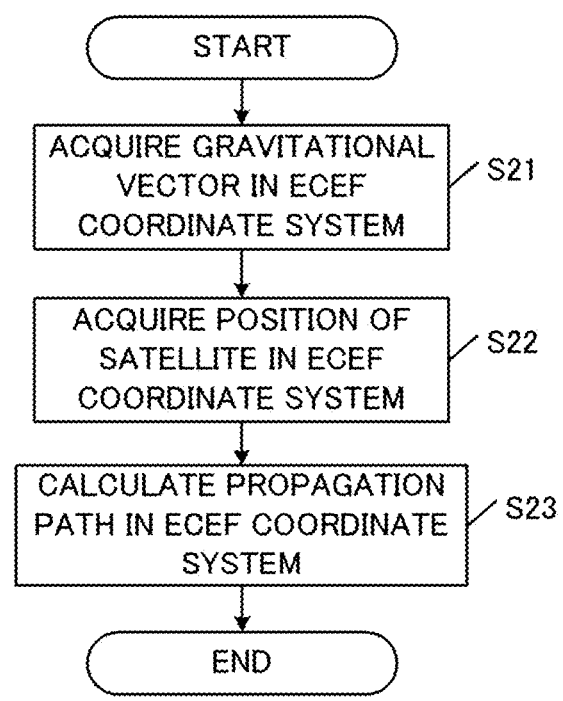
FIG. 6 is a flow chart of an antenna adjusting process.
Figure 7:
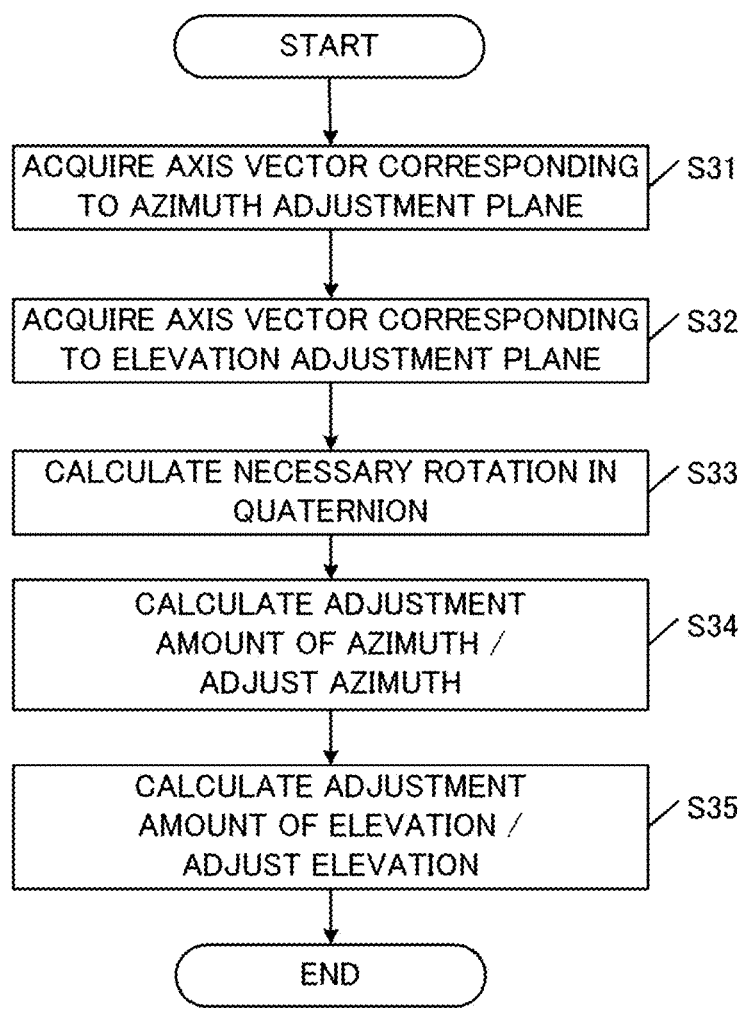
FIG. 7 is a flow chart of an antenna adjusting process.

FIGS. 5 to 7 are flow charts of the process performed by the calculating unit 23.

When starting antenna adjustment, first, the antenna 102 that is the object is assembled and placed in a state where an azimuth and an elevation thereof are adjustable. For example, the antenna may be fixed to a pole as shown in FIG. 2 or may be fixed to a flat surface such as the railings of a balcony. When ready to start adjustment, the user inputs information indicating an intent to start adjustment through the input/output unit 24.

Next, the calculating unit 23 prompts the user to install the sensor module 10 on the antenna through the input/output unit 24, and waits for output sensor information to stabilize. In the present embodiment, the antenna 102 has a holder (a sensor base) for installing a sensor module and is configured such that the sensor can be mounted in a prescribed orientation. Once sensor information stabilizes, the process shown in FIG. 5 is started.

In step S11, coordinates of the sensor module 10 are acquired.

Specifically, GPS coordinates of the sensor module are acquired using the GPS receiving unit 13. Information obtained at this point is a combination of latitude ($\phi$), longitude ($\lambda$), and ellipsoid-relative height (h) which conforms to the WGS 84 datum (hereinafter, GPS geodetic coordinates). The calculating unit 23 converts the obtained GPS geodetic coordinates into the ECEF Cartesian coordinate system for subsequent calculations. The ECEF coordinate system refers to a Cartesian coordinate system with Earth's center as an origin in which each axis is defined as follows.

X axis: north pole direction of rotational axis of polar motion

Y axis: line of intersection between prime meridian and mean equatorial plane

Z axis: straight line forming a right-handed orthogonal system with Z axis and X axis Coordinates ($\phi$, $\lambda$, h) measured by GPS can be converted into coordinates P ($x_0$, $y_0$, $z_0$) in the ECEF Cartesian coordinate system using the following equations.

$x_0 = (N+h)\cos\phi \cdot \cos\lambda,$ $y_0 = (N+h)\cos\phi \cdot \sin\lambda$, and $z_0 = \{N(1-e^2)+h\} \cdot \sin\phi,$ where $N = a/\sqrt{(1-e^2 \sin^2\phi)}$ and $e^2 = 2f - f^2$ (a denotes mean radius of equatorial plane and f denotes oblateness of Earth).

In step S12, using the geomagnetic sensor 12, a magnetic north direction relative to the sensor module 10 is acquired and a true north direction is calculated. Specifically, a magnetic north direction in a Cartesian coordinate system with the sensor module as a reference (hereinafter, a sensor coordinate system) is acquired and a direction of true north is determined based on a deflection angle between magnetic north and true north at the coordinates P. The determined direction is temporarily stored as a vector in the sensor coordinate system. While a true north direction is calculated using a geomagnetic sensor in the present example, a true north direction can also be calculated using other sensors. For example, a minute acceleration change (a Coriolis force) caused by Earth's rotation may be detected using an acceleration sensor or a gyro sensor and combined with GPS coordinates to calculate a true north direction.

In step S13, a vector of a direction of gravitational force in the sensor coordinate system is acquired using the acceleration sensor 11. When a measurement value of the X axis, a measurement value of the Y axis, and a measurement value of the Z axis of the acceleration sensor are respectively denoted by $g_x$, $g_y$, and $g_z$, a vector g' of the direction of gravitational force can be expressed as ($g_x$, $g_y$, $g_z$). In addition, a unit vector with a same orientation can be expressed as g'/|g'|.

It should be noted that, while acceleration in the direction of gravitational force is also influenced by a centrifugal force due to Earth's rotation, acceleration due to rotation, gravitational attraction of the moon and sun, and the like, since these factors are significantly smaller than Earth's gravitational pull, the factors will be ignored herein.

In the following description (with the exception of mathematical expressions), a vector will be denoted by a variable v (a vector in the direction of gravitational force by g) and an arrow symbol denoting a vector will be omitted. In addition, a single apostrophe (') represents a Cartesian coordinate system with the sensor module as a reference (the sensor coordinate system) and a double apostrophe (") represents a Cartesian coordinate system with the antenna as a reference (hereinafter, an antenna coordinate system). The ECEF coordinate system is represented when apostrophes are not used.

The processes of steps S12 and S13 are repeated at a prescribed period to constantly update and maintain the true north direction and the direction of gravitational force as a true north vector ($v_{tn}'$) and a gravitational vector (g') in the sensor coordinate system. A method of utilizing these pieces of information will be described later.

Next, the process shown in FIG. 6 is executed.

Step S21 is a step of acquiring a gravitational vector at the point P where the sensor module 10 is installed in the ECEF coordinate system. Since latitude obtained by GPS is based on a reference ellipsoid of WGS 84, a vector is required which connects an origin of the ECEF coordinate system (in other words, Earth's center) and the point P where the sensor module 10 is installed.

Since the coordinates ($x_0$, $y_0$, $z_0$) of the point P is already acquired in step S11, a gravitational vector $g_p$ at the point P in the ECEF coordinate system can be expressed as ($-x_0$, $-y_0$, $-z_0$). In addition, a unit vector with a same orientation can be expressed as $g_p/|g_p|$.

In step S22, a position of the satellite to be tracked by the antenna is acquired using the ECEF coordinate system. In this case, coordinates of the satellite are assumed to be ($x_{tgt}$, $y_{tgt}$, $z_{tgt}$).

Since a geostationary orbit satellite exists at a constant altitude above the equator and at an arbitrary longitude, once the longitude of the satellite is known, a conversion to coordinates in the ECEF Cartesian coordinate system can be performed. For example, when the satellite is positioned at $\beta$ E longitude, coordinates ($x_{tgt}$, $y_{tgt}$, $z_{tgt}$) in the ECEF Cartesian coordinate system can be expressed as ($r_{fss} \cos\beta$, $r_{fss} \sin\beta$, 0), where $r_{fss}$ denotes a radius of revolution of the geostationary orbit satellite. It should be noted that, while the radius of revolution actually varies slightly, since the variation is in the order of 20 to 50 km and therefore significantly smaller than the radius of revolution, the variation will be ignored herein.

As shown in FIG. 4, $\beta$ and $r_{fss}$ are stored in advance in the satellite information storage unit 22. While $\beta$ and $r_{fss}$ are used in the present example, other information may be used as long as a position of the satellite can be specified.

In step S23, a vector corresponding to a propagation path connecting the satellite and the antenna is obtained.

Since the coordinates of the sensor module 10 are ($x_0$, $y_0$, $z_0$) and the coordinates of the satellite are ($x_{tgt}$, $y_{tgt}$, $z_{tgt}$), a straight line connecting these two points can be expressed by Expression (1).

$$\frac{x-x_0}{x_{tgt}-x_0} = \frac{y-y_0}{y_{tgt}-y_0} = \frac{z-z_0}{z_{tgt}-z_0} \qquad \text{Expression (1)}$$

In addition, a vector ($v_{tgt}$) connecting these two points can be expressed by ($x_{tgt}-x_0$, $y_{tgt}-y_0$, $z_{tgt}-z_0$). Furthermore, a unit vector with a same orientation can be expressed as $v_{tgt}/|v_{tgt}|$.

Next, the process shown in FIG. 7 is executed.

The antenna 102 that is an object on which an adjustment is performed in the present embodiment is rotatable in the azimuth and elevation directions. However, as described earlier, an installation stand of the antenna (the installation pole 201 in the example shown in FIG. 2) is not necessarily vertical. In consideration thereof, the antenna adjusting apparatus according to the present embodiment detects an orientation of an axis around which the antenna is rotatable and calculates an angle by which the antenna is to be rotated around the axis.

Step S31 is a step of acquiring an axis for adjusting the azimuth and step S32 is a step of acquiring an axis for adjusting the elevation. In addition, steps S33 to S35 are steps for calculating necessary amounts of rotation based on the acquired axes.

In step S31, the user is notified via the input/output unit 24 to fix the elevation of the antenna and move the antenna in an adjustment direction of the azimuth.

Specifically, while rotating the antenna in the adjustment direction of the azimuth, the antenna is temporarily stopped at three or more different arbitrary positions and, in this state, the calculating unit 23 obtains a gravitational vector in the sensor coordinate system.

Accordingly, a plane which passes through coordinate points of vectors obtained at three points is defined and a normal of the plane is adopted as a rotational axis of azimuth adjustment. In other words, a unit vector of the normal and a unit vector of the rotational axis are either the same or are inverse vectors.

When gravitational vectors (vectors in the sensor coordinate system) measured at three different points are expressed as $$v_a'=(x_a,y_a,z_a), \qquad (1)$$

$$v_b'=(x_b,y_b,z_b), \qquad (2)$$

and $$v_c'=(x_c,y_c,z_c), \qquad (3)$$

by respectively regarding the three gravitational vectors as position vectors at points A, B, and C, a normal vector of a plane passing through the three points can be obtained from cross products of any two of (AB), (BC), and (CA) (vector signs are omitted). (AB) and (BC) can be expressed by Expression (2).
[Math. 2]

$$\vec{AB}=(x_b-x_a,y_b-y_a,z_b-z_a), \vec{BC}=(x_c-x_b,y_c-y_b,z_c-z_b) \quad \text{Expression}(2)$$

In addition, the two cross products can be expressed by Expression (3). It should be noted that, although a calculation formula is omitted, a unit vector is temporarily stored as $v_{AZ}'$ for subsequent calculations.

The gravitational vector g' and $v_{AZ}'$ coincide with each other when the antenna is installed horizontally with respect to the direction of gravitational force. However, when the antenna is not installed horizontally with respect to the direction of gravitational force, an axis for adjusting the azimuth (a vector in the ECEF coordinate system) can be obtained by obtaining a rotation quaternion from two vectors.

[Math. 3]

$$\vec{AB}\times\vec{BC} = \begin{bmatrix} (y_c-y_b)(z_b-z_a)-(z_c-z_b)(y_b-y_a), \\ (z_c-z_b)(x_b-x_a)-(x_c-x_b)(z_b-z_a), \\ (x_c-x_b)(y_b-y_a)-(y_c-y_b)(x_b-x_a) \end{bmatrix} \quad \text{Expression (3)}$$

In step S32, the user is notified via the input/output unit 24 to fix the azimuth of the antenna and move the antenna in an adjustment direction of the elevation.

Specifically, while rotating the antenna in the adjustment direction of the elevation, the antenna is temporarily stopped at three or more different arbitrary positions and, in this state, the calculating unit 23 obtains a gravitational vector in the sensor coordinate system.

Accordingly, a plane which passes through coordinate points of vectors obtained at three points is defined and a normal of the plane is adopted as a rotational axis of elevation adjustment. In other words, a unit vector of the normal and a unit vector of the rotational axis are either the same or are inverse vectors.

Since a calculation formula is similar to that of step S31, a description will be omitted here.

In addition, in a similar manner to step S31, a unit vector of the acquired vector is temporarily stored as $v_{EL}'$.

Step S33 is a step of calculating an amount of rotation necessary to make a vector connecting the satellite and the antenna (the vector $v_{tgt}$ acquired in step S23) and a vector corresponding to the directional axis of the antenna coincide with each other. It should be noted that, since $v_{EL}'$ rotates in synchronization with a rotation in the azimuth direction, when the antenna rotates in the azimuth direction, $v_{EL}'$ must be corrected in accordance with an amount of rotation.

Before giving a specific description of a calculation of an amount of rotation, a formula applicable when expressing an operation of moving a given vector to another vector as a quaternion rotation will be presented.

A hypothetical case where there are a vector $v_1=(x_1, y_1, z_1)$ and a vector $v_2=(x_2, y_2, z_2)$ and $v_1$ is to be rotated to $v_2$ will now be considered. Expressing rotation requires a vector of a rotational axis and a rotation angle. The vector of a rotational axis is a normal vector of a plane including two vectors and, therefore, corresponds to a cross product of the two vectors (Expression (4)).
[Math. 4]

$$\vec{v_2}\times\vec{v_1}=(y_2z_1-z_2y_1,z_2x_1-x_2z_1,x_2y_1-y_2x_1) \qquad \text{Expression (4)}$$

Next, a rotation angle will be described. Using the formula of inner product (Expression (5)), a rotation angle $\theta$ can be expressed as Expression (6).

[Math. 5]

$$\vec{v_2}\cdot\vec{v_1} = |\vec{v_2}||\vec{v_1}|\cos\theta \qquad \text{Expression (5)}$$

[Math. 6]

$$\cos\theta = \frac{\vec{v_2}\cdot\vec{v_1}}{|\vec{v_2}||\vec{v_1}|} = \frac{x_2x_1+y_2y_1+z_2z_1}{\sqrt{x_2^2+y_2^2+z_2^2}\sqrt{x_1^2+y_1^2+z_1^2}} \qquad \text{Expression (6)}$$

$$\theta = \cos^{-1}\left(\frac{x_2x_1+y_2y_1+z_2z_1}{\sqrt{x_2^2+y_2^2+z_2^2}\sqrt{x_1^2+y_1^2+z_1^2}}\right)$$

A quaternion representing rotation is defined by the vector to be a rotational axis and a rotation angle obtained earlier. Specifically, when the vector corresponding to the rotational axis is denoted by $v_{axis}$ and the rotation angle is denoted by $\theta$, a quaternion corresponding to the rotation can be expressed by Expressions (7) to (9).
[Math. 7]

$$\tilde{q}=(q_0,\vec{q})=(q_0,q_1,q_2,q_3) \qquad \text{Expression}(7)$$

[Math. 8]

$$\vec{v}_{axis}=(x_{axis},y_{axis},z_{axis}) \qquad \text{Expression}(8)$$

[Math. 9]

$$\tilde{q}=(\cos\theta/2, \sin\theta/2\vec{v}_{axis})=(\cos\theta/2,x_{axis}, \sin\theta/2,y_{axis}$$
$$\sin\theta/2,z_{axis} \sin\theta/2) \qquad \text{Expression}(9)$$

In addition, a complex number representation of the quaternion is as expressed by Expression (10), where i, j, and k denote basis vectors of a Cartesian coordinate system. This translates to having the following characteristics.

$i^2=j^2=k^2=ijk=-1$
$ij=-ji=k, jk=-kj=i, ki=-ik=j$

[Math. 10]

$$\tilde{q}=q_0+q_1 i+q_2 j+q_3 k=\cos\theta/2+(x_{axis}\sin\theta/2)i+(y_{axis}\sin\theta/2)j+(z_{axis}\sin\theta/2)k \qquad \text{Expression(10)}$$

In calculating the rotation, definitions of a conjugate quaternion (Expression (11)), a norm (Expression (12)), and an inverse quaternion (Expression (13)) are used in addition to Expressions (7) and (10).

[Math. 11]

$$\tilde{q}^* = (q_0, -\vec{q}) = (q_0, -q_1, -q_2, -q_3) = a - q_0 - q_1 i - q_2 j - q_3 k \qquad \text{Expression (11)}$$

[Math. 12]

$$|\tilde{q}| = \sqrt{(q_0^2+q_1^2+q_2^2+q_3^2)} = \sqrt{\tilde{q}\tilde{q}^*} = \sqrt{\tilde{q}^*\tilde{q}} \qquad \text{Expression (12)}$$

[Math. 13]

$$\tilde{q}^{-1} = \frac{\tilde{q}^*}{|\tilde{q}|} \qquad \text{Expression (13)}$$

Now, with respect to the two vectors $v_1=(x_1, y_1, z_1)$ and $v_2=(x_2, y_2, z_2)$ described above, when a quaternion representing the rotation from $v_1$ to $v_2$ is denoted by q, the rotation can be expressed by Expression (14) (hereinafter, a quaternion will be represented using a variable q and tildes will be omitted in the description). In addition, when the coordinate system is rotated so that the vector $v_1$ coincides with the vector $v_2$, the rotation can be expressed by Expression (15).

[Math. 14]

$$\vec{v}_2=\tilde{q}^*\vec{v}_1\tilde{q} \qquad \text{Expression(14)}$$

[Math. 15]

$$\vec{v}_2=\tilde{q}\vec{v}_1\tilde{q}^* \qquad \text{Expression(15)}$$

Since the quaternion representing the rotation can be regarded as a function having the vectors $v_1$ and $v_2$ as parameters, the rotation can also be expressed by Expression (16).

[Math. 16]

$$\tilde{q}=Q(\vec{v}_1,\vec{v}_2) \qquad \text{Expression(16)}$$

Let us now return to the description of step S33. A quaternion representing a rotation can be used in any of the ECEF coordinate system, the antenna coordinate system, and the sensor coordinate system. While it is assumed that the ECEF coordinate system is used in the present embodiment, the antenna coordinate system and the sensor coordinate system may be used as long as information enabling conversion between coordinate systems is available.

Using a quaternion enables a rotation around an axis passing through an origin of a coordinate system to be obtained with a simple calculation. However, when using an axis which does not pass through the origin, the calculation becomes more complex since a center of rotation must be first moved to the origin and, after the rotation, coordinates prior to the rotation must be restored. In consideration thereof, subsequent calculations will be performed with an origin of the antenna coordinate system as a center of rotation.

Note that, while a rotational axis of elevation adjustment of the antenna may not always pass through the origin of the antenna coordinate system, the rotational axis of elevation adjustment sufficiently approximates the origin in the ECEF coordinate system and is negligible. In other words, the following description will be given on the premise that the origin of the Cartesian coordinate system of a quaternion space and the origin of the antenna coordinate system coincide with each other.

When a vector corresponding to the directional axis of the antenna in the antenna coordinate system is denoted by $v_{pnt}''$ and a vector corresponding to the directional axis of the antenna in the sensor coordinate system is denoted by $v_{pnt}'$, a relationship between both vectors is as expressed by Expression (17), where a→s denotes a rotation from the antenna coordinate system to the sensor coordinate system. A quaternion $q_{a \to s}$ representing the rotation is stored in advance in accordance with a positional relationship between the antenna coordinate system and the sensor coordinate system. For example, the quaternion $q_{a \to s}$ may be stored in the calculating apparatus 20 or may be acquired from the outside.

For example, the quaternion representing $q_{a \to s}$ may be encoded and converted into a two-dimensional barcode, a print-out of the barcode may be placed near the sensor base, and the calculating apparatus 20 may acquire the barcode (for example, capturing an image of the barcode with a camera and decoding the barcode). Accordingly, even when the sensor base is provided in plurality, a corresponding quaternion can be readily acquired.

[Math. 17]

$$\vec{v}_{pnt}'=\tilde{q}_{a \to s}(\vec{v}_{pnt}'')\tilde{q}^*_{a \to s} \qquad \text{Expression(17)}$$

Next, using (1) $g_p'/|g_p'|$ denoting a unit vector of gravitational force in the sensor coordinate system at the location where the antenna is installed, (2) a meridional plane including the location where the antenna is installed as obtained from $v_{tn}'$ denoting a unit vector representing the true north direction and the unit vector of gravitational force, and (3) g/|g| denoting a unit vector of gravitational force in the ECEF coordinate system, a relationship between the ECEF coordinate system and the sensor coordinate system in terms of quaternion rotation is expressed as Expression (18). Note that s→e denotes a rotation from the sensor coordinate system to the ECEF coordinate system.

[Math. 18]

$$\tilde{q}_{s \to e} = Q\left(\frac{\vec{g}}{|\vec{g}|}, \frac{\vec{g}_p'}{|\vec{g}_p'|}\right) \qquad \text{Expression (18)}$$

$$\frac{\vec{g}_p'}{|\vec{g}_p'|} = \tilde{q}_{s \to e}\left(\frac{\vec{g}}{|\vec{g}|}\right)\tilde{q}^*_{s \to e}$$

$$\frac{\vec{g}}{|\vec{g}|} = \tilde{q}^*_{s \to e}\left(\frac{\vec{g}_p'}{|\vec{g}_p'|}\right)\tilde{q}_{s \to e}$$

Using this quaternion enables a vector ($v_{pnt}$) corresponding to the directional axis of the antenna represented by the ECEF coordinate system to be obtained as expressed by Expression (19)

[Math. 19]

$$\vec{v}_{pnt}=\tilde{q}_{s \to e}(\vec{v}_{pnt}')\tilde{q}^*_{s \to e}=\tilde{q}_{s \to e}\tilde{q}_{a \to s}(\vec{v}_{pnt}'')\tilde{q}^*_{a \to s}\tilde{q}^*_{s \to e} \qquad \text{Expression (19)}$$

In the description heretofore, a vector ($v_{pnt}$) corresponding to the directional axis of the antenna represented by the ECEF coordinate system and a vector ($v_{tgt}$) corresponding to the direction of the satellite represented by the ECEF coordinate system are obtained. Next, a rotation for making the two vectors coincide with each other is obtained. When a necessary rotation is expressed by a quaternion $q_{adj}$, $q_{adj}$ can be expressed by Expression (20).

[Math. 20]

$$\tilde{q}_{adj} = Q\left(\frac{\vec{v}_{tgt}}{|\vec{v}_{tgt}|}, v_{pnt}\right) \qquad \text{Expression (20)}$$

In step S33, the necessary rotation is acquired as the quaternion $q_{adj}$. Now, before making a transition to step S34, the axis vector $v_{AZ}'$ corresponding to the azimuth adjustment plane and the axis vector $v_{EL}'$ corresponding to the elevation adjustment plane acquired in step S31 are converted to the ECEF coordinate system to obtain vectors $v_{AZ}$ and $v_{EL}$. A conversion formula is as expressed by Expression (21).
[Math. 21]

$$\vec{v}_{AZ} = \tilde{q}_{s \to e}(\vec{v}_{AZ}')\tilde{q}^*_{s \to e} \vec{v}_{EL} = \tilde{q}_{s \to e}(\vec{v}_{EL}')\tilde{q}^*_{s \to e} \qquad \text{Expression (21)}$$

Next, in steps S34 and S35, based on the obtained rotation $q_{adj}$, an angle by which the antenna is to be rotated is calculated for each axis. In other words, rotation angles around axes denoted by $v_{AZ}$ and $v_{EL}$ are respectively calculated. An angle by which the antenna is to be adjusted in the azimuth direction is denoted by $\alpha$ and an angle by which the antenna is to be adjusted in the elevation direction is denoted by $\beta$.

When the azimuth is changed, the rotational axis $v_{EL}$ in the elevation direction also moves. Therefore, in the present embodiment, an adjustment amount of the azimuth is first calculated and an adjustment amount of the elevation is subsequently calculated. In the following description, $v_{EL}$ will be considered a rotational axis in a corrected elevation direction after a rotation around the axis $v_{AZ}$.

In step S34, the azimuth is adjusted.

When a rotation quaternion indicating a rotation around the axis $v_{AZ}$ is denoted by $q_{AZ}$ and a rotation quaternion indicating a rotation around the axis $v_{EL}$ is denoted by $q_{EL}$, the rotation quaternions can be expressed by Expression (22).

[Math. 22]

$$q_{AZ} = \cos\frac{\alpha}{2} + u_{AZ}\sin\frac{\alpha}{2}, \qquad \text{Expression (22)}$$
$$q_{EL} = \cos\frac{\beta}{2} + u_{EL}\sin\frac{\beta}{2},$$
(where $u = ix_v + jv_v + kz_v$)

In addition, when the adjustment of the azimuth direction is performed first, the obtained rotation $q_{adj}$ can be expressed as $$q_{adj} = q_{EL} q_{AZ}.$$

Therefore, rotation angles ($\alpha$ and $\beta$) around the respective axes can be determined by obtaining $\alpha$ and $\beta$ satisfying Expression (23).
[Math. 23]

$$v_{tgt} = q_{EL} q_{AZ} v_{pnt} q^*_{AZ} q^*_{EL} \qquad \text{Expression(23)}$$

Once the calculation of $\alpha$ is finished, a result thereof is presented to the user through the input/output unit 24 to have the user perform the adjustment of the azimuth. When the adjustment is completed, the user is asked to input information to that effect and the process advances to step S35. The process of step S35 is similar to the process of step S34. For example, a calculation result is presented to the user through the input/output unit 24 to have the user perform the adjustment of the elevation.

At the end of the present step, a direction of orientation of the antenna should coincide with a theoretical value.

Figure 8:
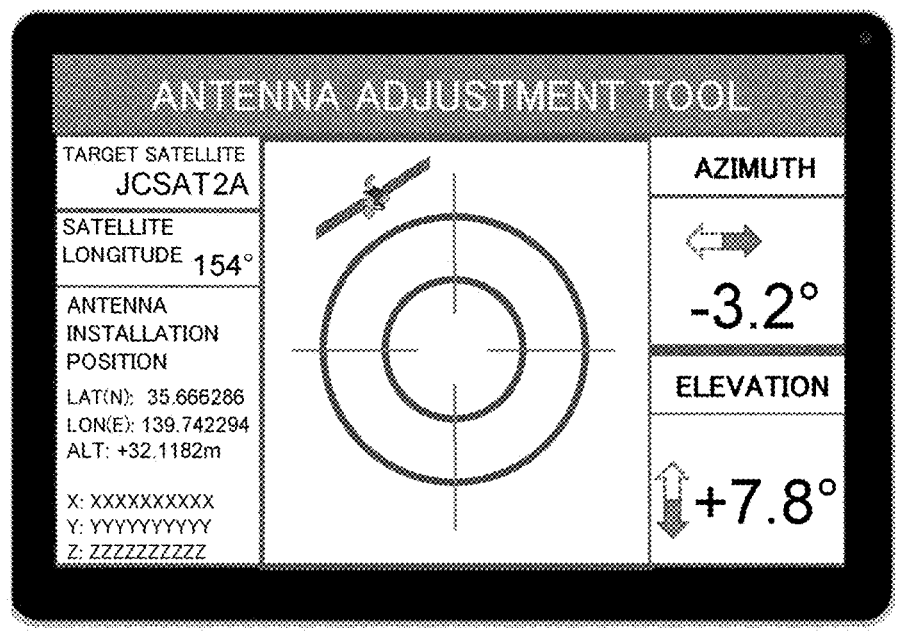
FIG. 8 shows an example of a screen displayed on a calculating apparatus.

While the adjustment of the azimuth and the adjustment of the elevation are performed in separate steps in the present example, the adjustments may be executed in parallel instead. For example, the user may be asked to perform the adjustments by displaying a screen such as that shown in FIG. 8.

As described above, the antenna adjusting apparatus according to the first embodiment obtains an amount of rotation by which an antenna needs to be adjusted by mounting a sensor to an antenna to acquire information relating to an attitude of the antenna and then converting the attitude into the ECEF coordinate system. Accordingly, the amount of rotation by which an adjustment needs to be made can be acquired.

In addition, by actually moving the antenna, a vector corresponding to an axis for adjusting an azimuth and a vector corresponding to an axis for adjusting an elevation are acquired. Accordingly, even when the antenna is installed in a state where an axis is inclined, an angle by which the antenna needs to be adjusted can be calculated with precision.

Alternatively, during adjustment, information may be periodically acquired from the sensor and processes of steps S33 to S35 may be repetitively performed. In other words, the angle by which the antenna needs to be rotated may be notified in real-time while adjusting the angle of the antenna.

(Second Embodiment)

When electromagnetic waves transmitted and received by an antenna use circular polarization or do not exhibit polarization separation, the antenna can be adjusted with the antenna adjusting apparatus according to the first embodiment. However, when polarization separation by horizontal polarization and vertical polarization is performed, an adjustment of a polarization angle may be required. In a second embodiment, an antenna adjusting apparatus capable of adjusting a polarization angle will be described.

A plane which includes an orientation of oscillation of an electric field and a direction of propagation of electromagnetic waves is referred to as a polarization plane. In applications such as terrestrial microwave communication, with a direction of gravitational force at an installation location as a reference, polarization which is literally horizontal is referred to as horizontal polarization and polarization which is literally vertical is referred to as vertical polarization. In this case, polarization angles can be made to coincide with each other using the direction of gravitational force as a reference. On the other hand, in linear polarization used in satellite communication, since an earth station is positioned on a three-dimensional spherical surface (or an ellipsoidal surface), it is difficult to make polarization angles coincide with each other using the direction of gravitational force as a reference. However, with the antenna adjusting apparatus according to the present invention, since a polarization axis of a satellite and a polarization axis of an earth station can be expressed using the ECEF coordinate system, an adjustment angle for making the polarization angles coincide with each other can be readily calculated.

In the second embodiment, the sensor module 10 is mounted at a location where, when a polarization angle of the antenna is changed, an attitude of the sensor module also changes. In addition, a plane including a polarization axis which opposes a straight line connecting an antenna and a satellite with each other is defined and a deviation from a polarization axis of the antenna being adjusted is calculated. In other words, a polarization axis is defined by a vector in the ECEF coordinate system, and an adjustment angle which causes the polarization axis of the antenna being adjusted to be parallel is calculated and presented to the user. Accordingly, the polarization angle can be adjusted to an ideal angle.

With a general geostationary orbit satellite, vertical polarization is defined so as to include an axis parallel to the Z axis in the ECEF coordinate system and horizontal polarization is defined as being orthogonal thereto. However, depending on the satellite, a certain inclination (tilt angle) may be imparted so that a polarization plane approaches vertical and horizontal relative to the ground surface in particular geographical regions. This problem can also be solved by calculating vectors in the ECEF coordinate system.

(Third Embodiment)

When an antenna that is an object of adjustment is fixed on the ground, once an adjustment of a direction of orientation (a polarization angle) is completed, the antenna does not require further adjustment.

On the other hand, when an antenna with strong directionality is mounted to a moving object (such as an aircraft, a ship, or a vehicle), a direction of a directional axis changes due to movement or a variation in attitude caused by travel of the moving object. In consideration thereof, automatic tracking antennas which automatically adjust a direction of orientation and a polarization plane of an antenna and perform rolling correction are used.

In a third embodiment, after measuring a change in attitude in a short time frame and assessing the change as a quaternion with the antenna adjusting apparatus according to the first or second embodiment, control corresponding to the conjugate quaternion thereof is output to an attitude control apparatus of an antenna. Accordingly, the antenna and a satellite can be arranged to always face each other.

While an independent antenna adjusting apparatus is used in the first and second embodiments, when an attitude control apparatus of an antenna is used, the attitude control apparatus may be configured to include functions of the antenna adjusting apparatus described above.

The embodiments described above merely represent examples and the present invention can be implemented with various modifications without departing from the spirit and scope of the invention.

For example, while dedicated hardware is assumed as the sensor module 10 in the description of the embodiments, the sensor module 10 may be a small computer such as a smartphone or a wearable computer.

In addition, while independent apparatuses are respectively assumed as the sensor module 10 and the calculating apparatus 20 in the description of the embodiments, the sensor module 10 and the calculating apparatus 20 may be included in a single piece of hardware (for example, a smartphone or a tablet computer). For example, a sensor built into a smartphone may be used as the sensor module 10 and the calculating apparatus 20 may be implemented by a program executed by the smartphone.

Furthermore, while an example of communication between the ground (an earth station) and a satellite has been presented in the description of the embodiments, the present invention can be applied to ground-to-ground wireless communication and to wireless communication between mobile objects in addition to satellite communication.

What is claimed is:

1. An antenna adjusting apparatus used for adjusting an attitude of an antenna having directionality and being capable of changing an attitude thereof to be changed by a plurality of axes, the antenna adjusting apparatus comprising:
    a sensor configured to acquire information relating to an attitude in a three-dimensional space, the sensor configured to acquire a direction of gravitational force, a true north direction, and GPS coordinates;
    a movable axis acquiring unit configured to acquire a plurality of vectors corresponding to the plurality of axes respectively by acquiring a change in output of the sensor for each of the axes when the antenna mounted with the sensor is rotated around each of the axes;
    a first direction acquiring unit configured to acquire a first direction corresponding to a directional axis of the antenna, based on the direction of gravitational force, the true north direction, and the GPS coordinates;
    a second direction acquiring unit configured to acquire a second direction, which is a direction with which the directional axis of the antenna is to be aligned; and
    a calculating unit configured to calculate, for each of the axes, a correction angle, which is an angle by which the antenna is to be rotated in order to make the first direction and the second direction coincide with each other, using the plurality of vectors, wherein
    the first direction and the second direction are expressed by an Earth-based coordinate system.

2. The antenna adjusting apparatus according to claim 1, wherein
    the second direction acquiring unit is configured to determine the second direction using the GPS coordinates acquired by the sensor and positional information of a satellite stored in advance.

3. The antenna adjusting apparatus according to claim 1, wherein
    the first direction acquiring unit is configured to acquire sensor position information, which is information relating to a mounting position of the sensor on the antenna, and to acquire the first direction further using the information.

4. The antenna adjusting apparatus according to claim 3, wherein
    the antenna includes one or more sensor bases for mounting the sensor, and
    the first direction acquiring unit is configured to acquire sensor position information corresponding to the sensor base, to which the sensor is mounted.

5. The antenna adjusting apparatus according to claim 1, wherein
    the first direction and the second direction are expressed using the ECEF coordinate system.

6. The antenna adjusting apparatus according to claim 1, further comprising
    a driving unit configured to change the attitude of the antenna by rotating the antenna around the plurality of axes, wherein
    the calculating unit is configured to calculate a correction angle necessary for tracking a satellite at a prescribed period, and the driving unit is configured to correct the attitude of the antenna, based on the calculated correction angle.

7. The antenna adjusting apparatus according to claim 1, wherein
the plurality of axes are constituted by an axis corresponding to an azimuth and an axis corresponding to an elevation.

8. An antenna adjusting method of adjusting an attitude of an antenna having directionality and being capable of changing an attitude thereof by a plurality of axes,
the antenna adjusting method comprising:
a movable axis acquiring step of acquiring a plurality of vectors corresponding to each of the plurality of axes by acquiring a change in output of a sensor for each of the axes when the antenna mounted with the sensor is rotated around each of the axes, the sensor being configured to acquire information relating to an attitude in a three-dimensional space, said information including a direction of gravitational force, a true north direction, and GPS coordinates;
a first direction acquiring step of acquiring a first direction corresponding to a directional axis of the antenna, based on the direction of gravitational force, the true north direction, and the GPS coordinates;
a second direction acquiring step of acquiring a second direction, which is a direction with which the directional axis of the antenna is to be aligned; and
a calculation step of calculating, for each of the axes, a correction angle, which is an angle by which the antenna is to be rotated in order to make the first direction and the second direction coincide with each other, using the plurality of vectors, wherein
the first direction and the second direction are expressed by an Earth-based coordinate system.

* * * * *